(12) United States Patent
Buresh

(10) Patent No.: US 11,654,466 B2
(45) Date of Patent: May 23, 2023

(54) PLANISHING HAMMER

(71) Applicant: Theodore Allen Buresh, Blair, WI (US)

(72) Inventor: Theodore Allen Buresh, Blair, WI (US)

(*) Notice: Subject to any disclaimer, the term of this patent is extended or adjusted under 35 U.S.C. 154(b) by 254 days.

(21) Appl. No.: 17/104,108

(22) Filed: Nov. 25, 2020

(65) Prior Publication Data

US 2021/0154717 A1 May 27, 2021

Related U.S. Application Data

(60) Provisional application No. 62/939,844, filed on Nov. 25, 2019.

(51) Int. Cl.
*B21D 1/06* (2006.01)
*B25D 17/24* (2006.01)

(52) U.S. Cl.
CPC .............. *B21D 1/065* (2013.01); *B25D 17/24* (2013.01); *B25D 2217/0015* (2013.01); *B25D 2217/0073* (2013.01); *B25D 2222/21* (2013.01)

(58) Field of Classification Search
CPC .................... B21D 1/065; B25D 17/24; B25D 2217/0015; B25D 2217/0073; B21J 13/06
USPC .......................................... 173/128; 72/466.6
See application file for complete search history.

(56) References Cited

U.S. PATENT DOCUMENTS

| | | | |
|---|---|---|---|
| 2,146,358 A | 2/1939 | Seiden et al. | |
| 2,148,943 A | 2/1939 | Hauschild | |
| 2,528,361 A | 10/1950 | Hauschild | |
| 2,633,766 A * | 4/1953 | Staszak | B25D 1/00 81/19 |
| 4,753,104 A * | 6/1988 | Strozier | B21D 1/06 72/457 |
| 6,923,031 B2 * | 8/2005 | Akins | B21D 1/06 72/705 |
| 2010/0206593 A1 * | 8/2010 | Schad | B25D 11/064 173/128 |
| 2013/0047694 A1 * | 2/2013 | Swanson | B21D 1/065 72/376 |
| 2016/0158819 A1 * | 6/2016 | Johnson | B25D 9/16 173/128 |
| 2017/0014960 A1 * | 1/2017 | Menissez | B25D 9/08 |
| 2017/0165733 A1 * | 6/2017 | Alvarez | B25B 11/007 |

* cited by examiner

*Primary Examiner* — Anna K Kinsaul
*Assistant Examiner* — Luis G Del Valle
(74) *Attorney, Agent, or Firm* — Antonio Papageorgiou, Esq.; Lombard Geliebter LLP

(57) ABSTRACT

A hand held planishing hammer is provided that includes a power unit mounted on a base plate with a handle and powering means that is controllable to produce a hammering action by a combination of a hammer head and slapper to provide flattening, smoothing, and polishing of sheet metal for the aircraft, automobile collision repair, restoration and architectural sheet metal industries.

20 Claims, 10 Drawing Sheets

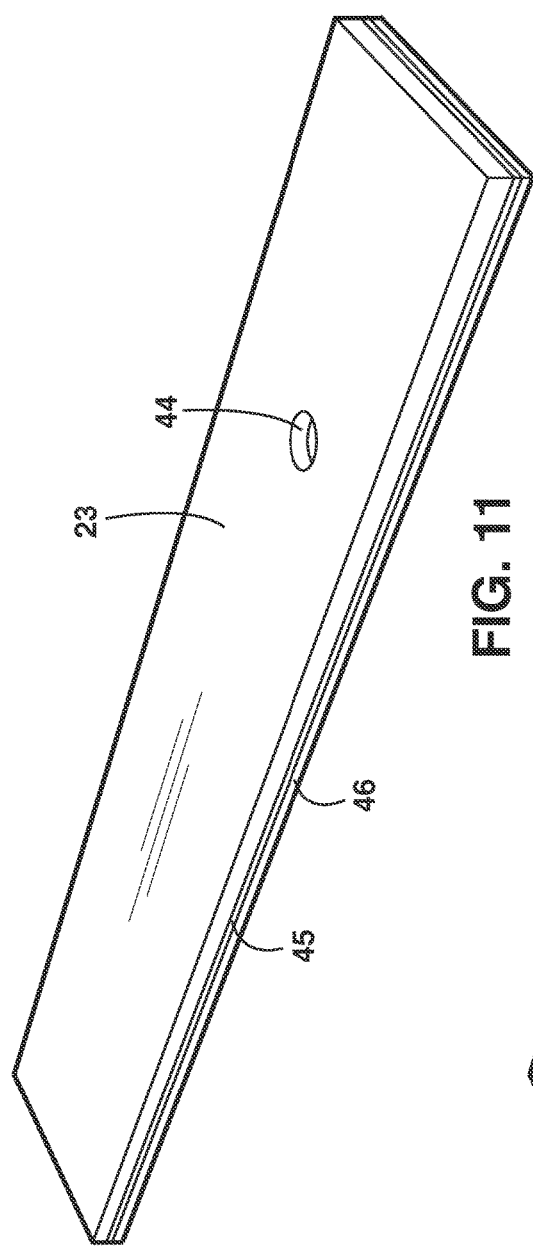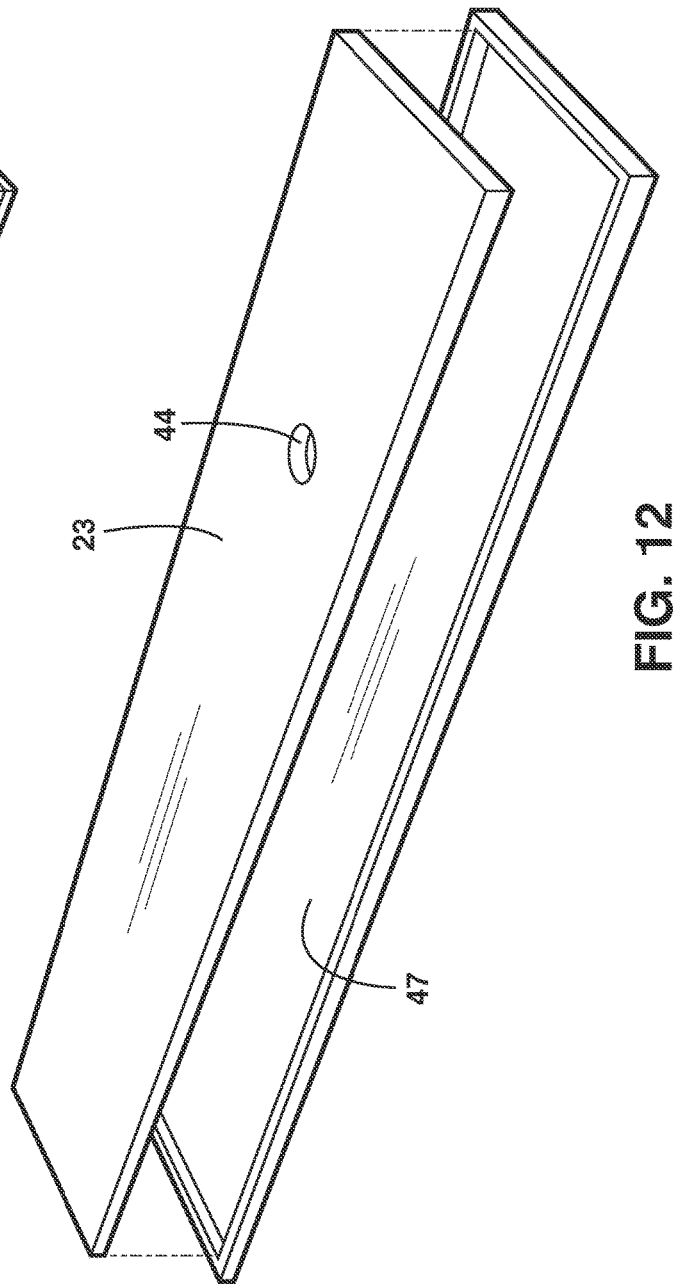

PLANISHING HAMMER

RELATED APPLICATION

This application claims the benefit of U.S. (Provisional) Application No. 62/939,844, filed on Nov. 25, 2019, which is hereby incorporated herein by reference.

BACKGROUND OF THE INVENTION

The present application relates to hammers, and, in particular, to planishing hammers that are used to flatten, smooth, and/or polish sheet metal by lightly hammering.

The process of planishing generally involves applying many light blows to smooth sheet metal which has already been roughly formed by some other means. Before using a planishing hammer, the parts being made are first hammered out, roughed, or blocked out close to the general desired shape from sheet metal. Then, the roughed sheet metal is lightly hammered on the top surface with a planishing hammer while being supported from below by another object such as an anvil.

During the late 1930s to the early 1950s, air powered planishing hammers came into use to speed up industrial production primarily motivated by World War II. These planishing hammers are still in use today, but they are heavy, large, stationary devices requiring sheet metal to be fed into the jaws of the device and moved back and forth below the hammering action.

Today, there are many industries involved with sheetmetal working, such as the aircraft industry, automobile collision repair, restoration, and architectural sheet-metal work, to name a few. Even the re-creation of medieval combat armor has become a popular hobby and for some a small business for many individuals. These uses have sparked handheld tools to replace some of the larger machinery. Attempts have been made to create power planishing hammers for smaller shops and hobbyists, but they are still relatively large and more appropriate for larger industries. Moreover, handheld attempts are still too heavy for easy handheld use, produce too much bounce back, when in use, or have to be used in positions that are unnatural and difficult to control.

Accordingly, there is a need for a portable planishing hammer that is light weight, operates without or limited bounce back, is easy to control, relatively more affordable, and/or overcomes the problem of working in out of position modes.

SUMMARY OF THE INVENTION

In one aspect, a power planishing hammer is provided that includes: a power unit having a housing with a proximal end and a distal end opposite the proximal end and a handle in a horizontal direction between the proximal end and the distal end, the power unit housing including a hammer head movably coupled to the housing, the hammer head configured to move in a vertical direction reciprocally with an application of power from a power source; a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position; and a control lever for controlling application of the power.

In one embodiment, the power planishing hammer further includes a baseplate fixedly attached to the housing between the housing and the slapper.

In one embodiment, the power planishing hammer further includes at least one keeper attached circumferentially about at least a portion of the base plate, the at least one keeper configured to house the slapper therein.

In one embodiment, the baseplate is fixedly attached to the housing at the proximal end of the housing.

In one embodiment, the baseplate is unrestrained at the distal end of the housing.

In one embodiment, the power planishing hammer further includes a tubular hammer sleeve located between the housing and the base plate, the tubular hammer sleeve providing a housing for the hammer head.

In one embodiment, the power planishing hammer further includes a spring material at the proximal end between the baseplate and the slapper, such when the hammer head impacts the slapper, the spring material deflects elastically.

In one embodiment, the spring material isolates the slapper from the baseplate.

9 In one embodiment, the distance between the pivot point of the slapper and the hammer head is between about 6 inches and about 12 inches.

In one embodiment, the slapper has a width of about 2 inches to about 4 inches.

In one embodiment, the control lever allows for variable control of the power.

In one embodiment, the slapper has a planer outward face.

In one embodiment, the slapper has an outward face with a crown therein.

In one embodiment, the slapper has a semi-circular cylindrical face.

In one embodiment, the slapper has a tubular extension outward from the distal end of the housing.

In one embodiment, the slapper is removably attached to the housing and wherein the hammer head is interchangeable.

Additional aspects of the present invention will be apparent in view of the description which follows.

BRIEF DESCRIPTION OF THE FIGURES

FIG. 11 is a perspective view of the slapper with the blanket cover.
FIG. 12 is a perspective view of the slapper with a formed cover.

DETAILED DESCRIPTION OF THE INVENTION

Figure 1:
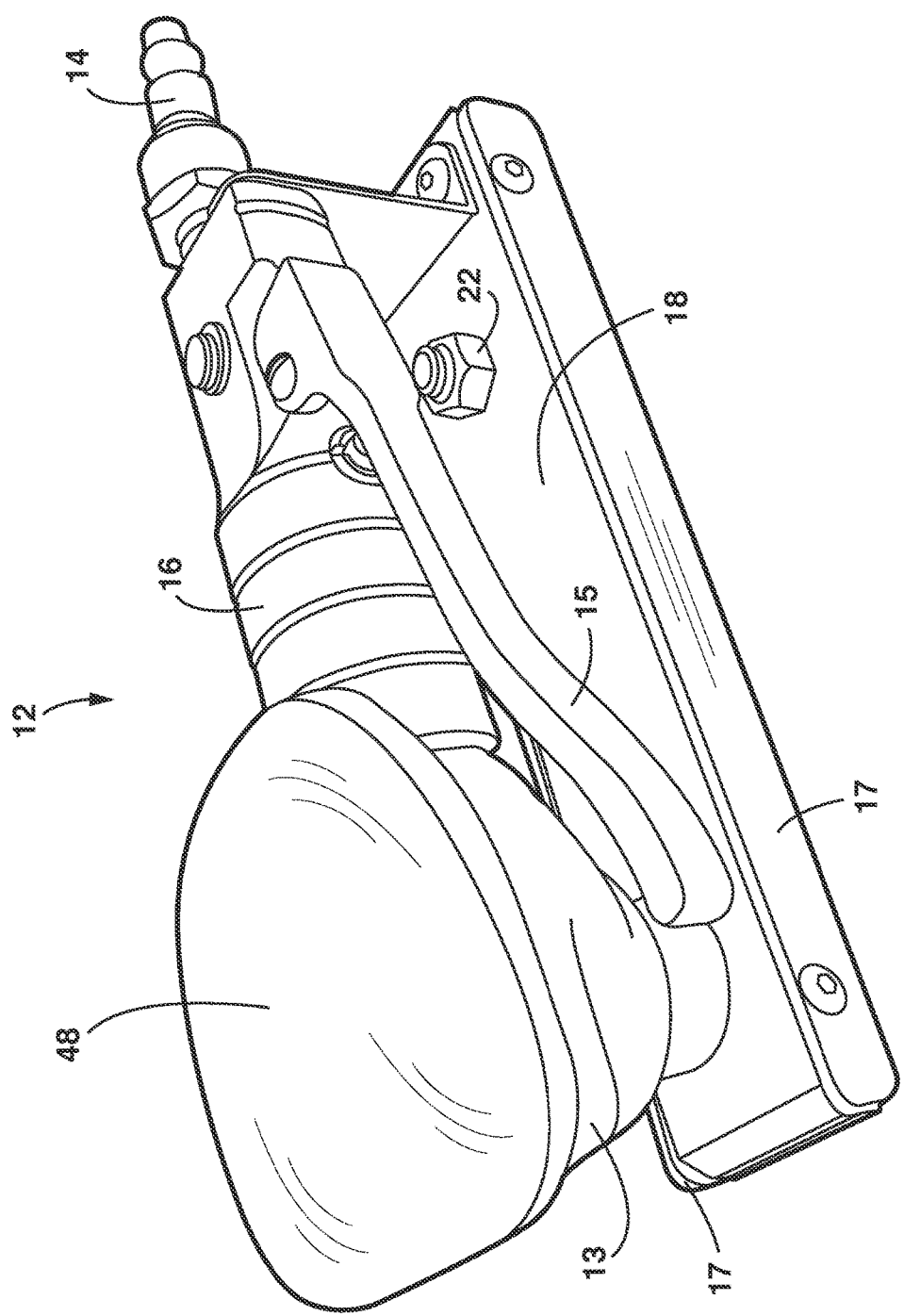
FIG. 1 is a perspective view of the plantation hammer.

Referring to FIG. 1 through FIG. 13, a planishing hammer 12 is provided that is preferably ergonomically lightweight, an easy to operate device that delivers precision blows, and that can be used to planish, smooth and finish not only metals, but also welds, damaged, dented and wrinkled sheet metals such as sheet steel, aluminum, brass, and copper, etc. The planishing hammer 12 can also be used to form, shape, bend, and/or hem metals. The planishing hammer 12 may be used in place of conventional handheld tools and powered hammers. The planishing hammer 12 can be power operated, such as by air pressure as shown, or any other forms of power, including electricity, both AC and DC, or any other means to produce a hammering action. The planishing hammer 12 can be constructed from steel, aluminum, plastic or other suitable structural materials. The various embodiments described herein are exemplary and are set forth to aid in the understanding of the invention(s) disclosed herein, and should not be construed to limit in any way the scope of the invention as defined in the claims which follow thereafter.

Handheld hammers on the market, today, weigh about 5 to 20 plus pounds. The planishing hammer 12 is lighter and weighs less than 5 pounds and more preferably only about 2 pounds and is portable. Moreover, the planishing hammer's 12 has a balanced structural configuration so that it delivers precision blows without producing bounce back, like most prior air hammers produce. The planishing hammer 12 may utilizes a foam covered palm grip 48 for ergonomic handling and a slapper 23 and a hammer head 29, shaped and configured to obtain superior, smoother, planishing in a quicker fashion and that may be produced in a way that is economically more affordable The planishing hammer 12 may be operated in a stable ergonomic horizontal position and somewhat out of position modes. In use, the hammer 12 may be positioned on its resting base 18, over the top of the sheet metal 41. The planishing hammer 12 according disclosed herein is able to produce an easy to obtain superior quality finish. Using the planishing hammer 12 eliminates working in an unstable or unnatural vertical position that is difficult to control. Because the planishing hammer 12 is a handheld tool, it can accommodate sheet metal 41 being moved into a horizontal or some hat horizontal position. Vertical or out of possession work performed with other hammers leaves damaging hammer marks if not perfectly square to the sheet metal 41 surface.

The planishing hammer 12 can be used in conjunction with stationary or portable anvils 39. Anvils 39 can be covered with plastic, leather, or other materials as an aid in moving and not marring the sheet metal 41. Existing auto body dollies can also be used as a planishing accessory 40 with the planishing hammer 12 to finish sheet metal 41 effectively.

Figure 2:
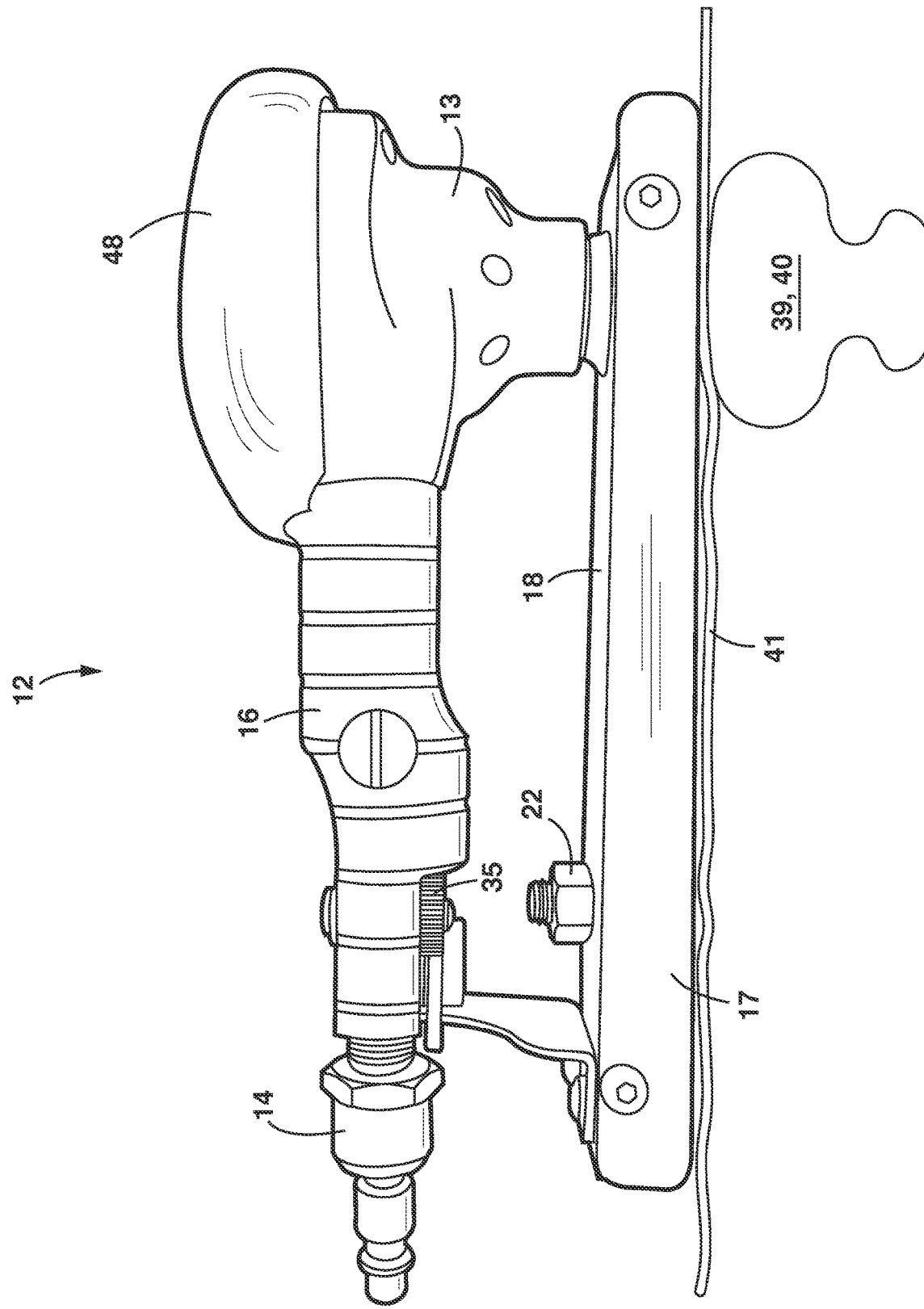
FIG. 2 is a left side view of the planishing hammer.

FIG. 1 is a perspective view of the planishing hammer 12 and FIG. 2 is a left side view of the planishing hammer 12 according to a preferred embodiment. As can be seen, the hammer 12 includes a power unit 13 and keeper 17/baseplate 18 housing that houses a slapper 23 pivotally coupled at the proximal end to the power unit 13. The power unit 13 generally provides vertical reciprocating up and down actuation of the slapper 23 toward the proximal end of the hammer 12 that hammers sheet metal placed under the slapper 23. The power unit 13 has a head portion at the distal end of the device 12 opposite the air supply port 14. Between the distal and proximal ends is a handle 16. The hammer 12 may be operated with a trigger or air control lever 15. Preferably, the lever 15 allows for the variable operation/speed of the power unit 13.

At least in one embodiment, the planishing hammer 12 measures about 8 inches long by about 3 inches wide by about 4 inches high. The planishing hammer 12 has a power unit 13 which is powered through an air supply port 14 and preferably operates with about between 80 and 100 pounds per square inch of air pressure. Air pressure can be regulated between on and off states with air throttle ability using air regulator valve 35 mounted toward the rear or proximal end of handle 16. Air pressure can be further controlled in an infinitely variable fashion between on and off states by manually hand squeezing an air control lever 15 as an inline air pressure regulator to produce an reciprocating up and down hammering action of hammer head 29. The handle 16 is preferably constructed from steel, aluminum, plastic or other suitable material capable of being shaped and hollowed to provide an air passage for the hammer head 29, through the center, to accommodate airflow and other working mechanisms.

Figure 3:
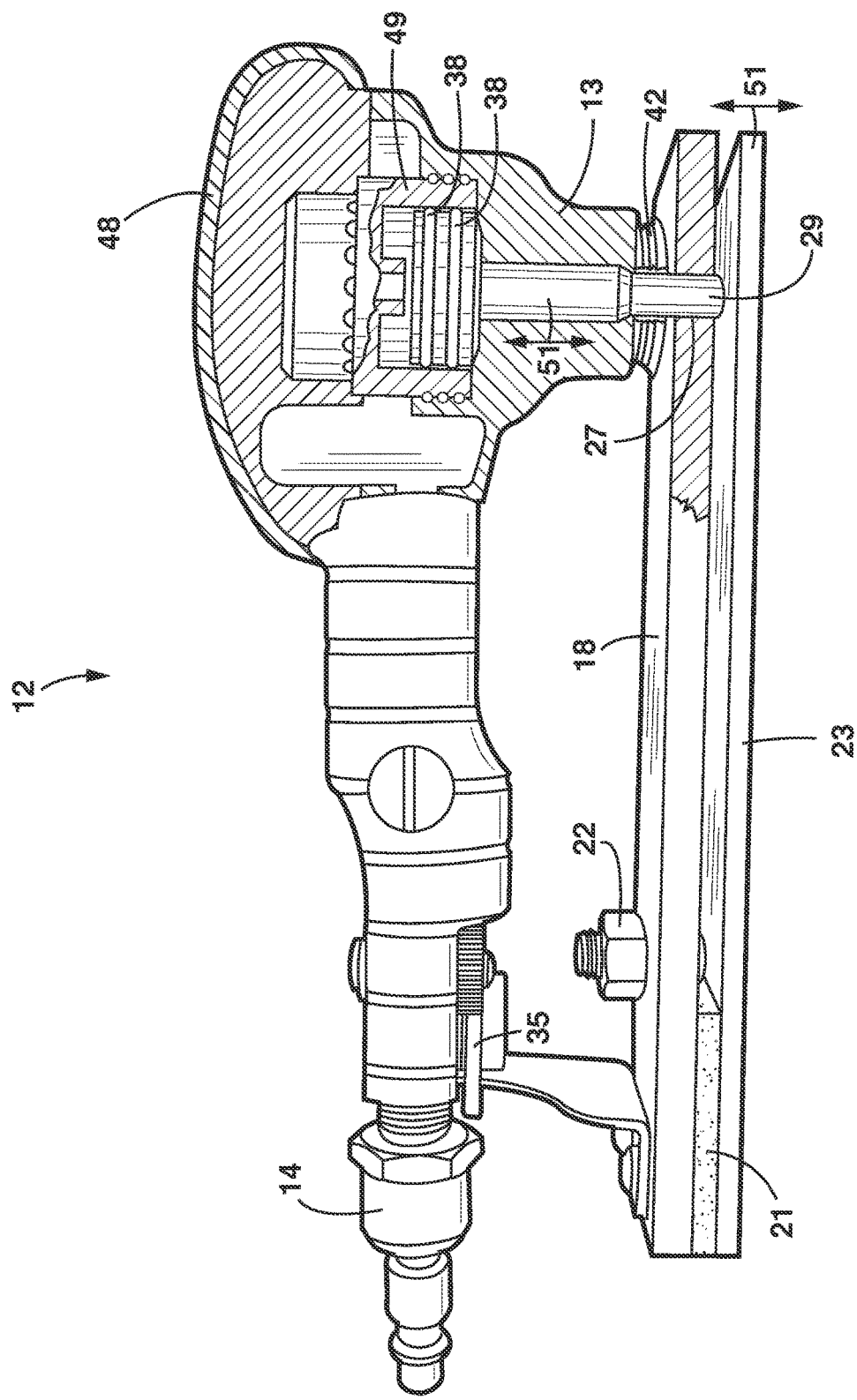
FIG. 3 is a left side cut away view of the planishing hammer.

Referring to FIG. 3, a partial cross section of the hammer 12 is provided. As can be seen, the hammer power unit 13 is fixedly attached to the base plate 18 at the distal end with an L shaped bracket. At the proximal end, the power unit 13 may be fixed to the base plate 18. Alternatively, the unit 13 may be unrestrained at the distal end. In this regard, the base plate 18 is essentially cantilevered to the power unit at the proximal end. A hammer sleeve 42 may form a seal between the power unit and the base plate 18 with the hammer head 29 disposed within the sleeve 42. At the proximal end, the slapper 23 is coupled to the unit 13 by means that allows the slapper 23 to move vertically at the distal end away from the unit 13 in response to one or more impacts or actuation by the hammer head 29 and return back to its initial position when the hammer head 29 retracts. In one embodiment, this is achieved by attaching the slapper 23 to base plate in a pivotal relationship with a spring material 21 there between. In one embodiment, the spring material 21 is an elastic sheet that deflects sufficiently to allow the slapper to move at the distal end while minimizing any deflection in the slapper 23. The return distance of the slapper may be controlled with adjustment nut 22. The dimensions of the slapper 23 may vary, depending on the desired flattening capability, however, to achieve at least some of the objectives, the distance between the pivoting point and the hammer head 29 is at least about 6 inches and up to about 12 inches or more.

In one embodiment of the planishing hammer 12, the slapper 23 could be absent or removable from the assembly. In this embodiment, the hammerhead 29 can contact a sheet metal surface 41 directly. Moreover, the hammerhead 29 may be interchangeable with other attachments for finishing and planishing sheet metal 41.

Figure 4:
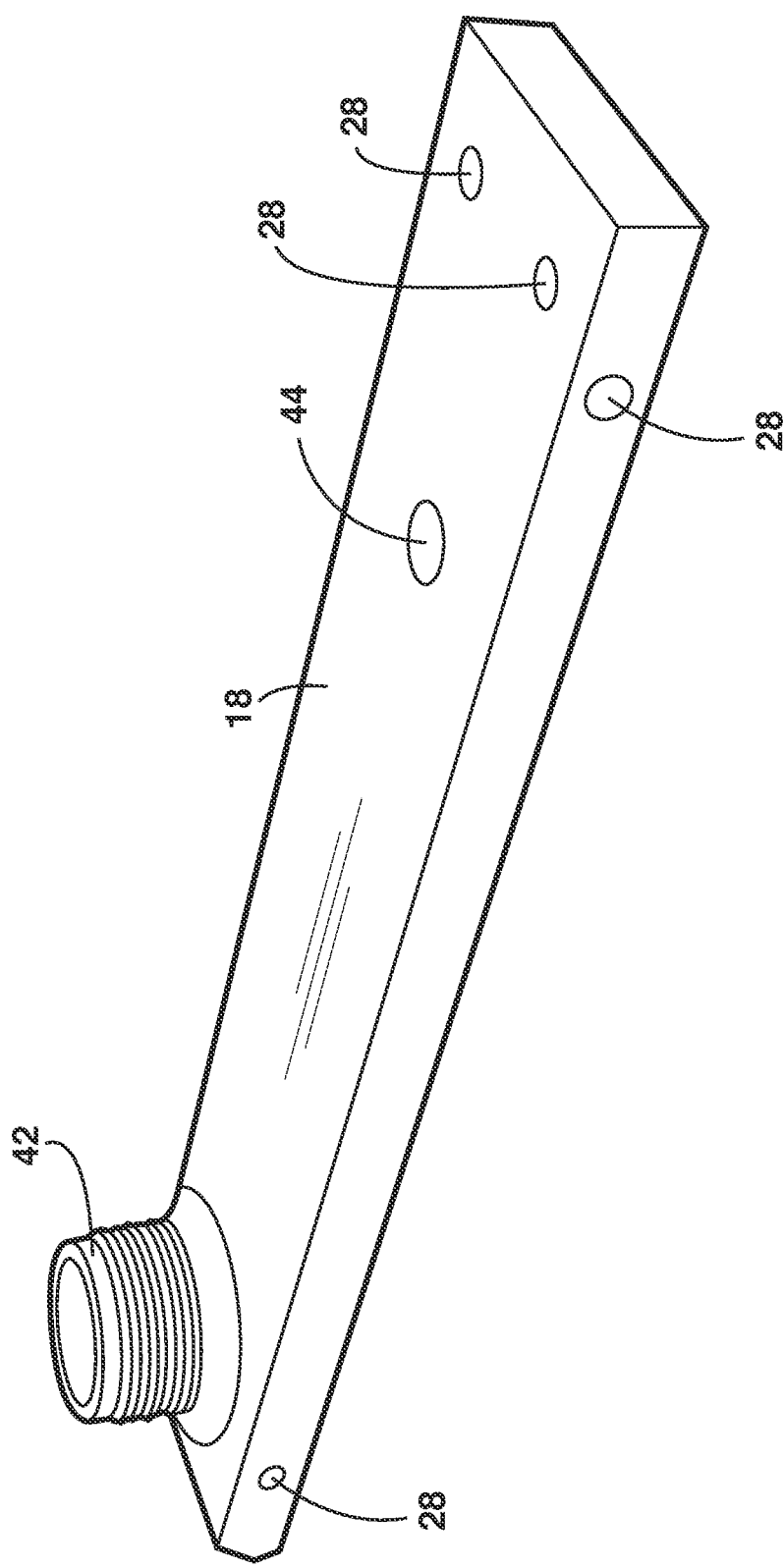
FIG. 4 is a perspective view of the planishing hammer base plate.

Referring to FIG. 4 a perspective view of the planishing hammer 12 base plate 18 according to one embodiment is shown. The base plate 18 measures sufficient to cover the slapping hammer. In a preferred embodiment, the base plate 18 is about 8 inches long (front to back) by about 1.5 inches wide (left to right) by about 0.375 inches high and has a tubular hammer sleeve 42 adjacent the distal end. The hammer sleeve 42 measures about 0.875 inches diameter and has a means to connect to power unit 13, such as with complementary geometry that retains the sleeve 42 to the unit 13. The base plate 18 contains at least one hole for adjusting screw hole 44, which may measure about 0.375 inches in diameter and mounting screw holes 28 measuring about 0.125 inches in diameter, each of which may be threaded. Mounting screw holes 28 on top of baseplate 18 serve to connect handle 16 to baseplate 18 directly or with the L-bracket shown. The base plate 18 could have other configurations, made from various structural materials and other dimensions, as well as is understood. Mounting screw holes 28 on the sides of base plate 18 serve to connect rail keepers 17 to base plate 18. Rail keepers 17 according to one embodiment are about 8 inches long, by about 0.5 inches wide on one end and about 0.75 inches wide at the other end, by about 0.125 inches thick and may be made from plastic. The rail keepers 17 are mounted on each side of the base plate 18 and align the slapper 23 with the base plate 18 and also protect the operator from engagement with the working mechanisms of the planishing hammer 12. The rail keepers 17 could have other configurations, as an example, such as washers or pins and be made from various structural materials and have other dimensions, as well.

Referring again to FIG. 3 a cut away view of the planishing hammer 12 according to one embodiment is shown. It is to be further noted an adjusting bolt 22 measures about 0.375 inches in diameter by about 1.125 inches long and secures slapper 23 by a nut to base plate 18. Spring material 21 measures about 1.5 inches long, by about 1.5 inches wide by about 0.25 inches thick and is made from resilient polyurethane foam material with a density of about 15 to 30 pounds per cubic foot. Spring material 21 is positioned at the rear of base plate 18 and is secured by a permanent adhesive to baseplate 18 forming a flexible connection and pivot point between base plate 18 and slapper 23. In other embodiments, other resilient material or resilient bodies such as a spring maybe incorporated. In other embodiments the pivot point and flexible connection could be placed closer to or further away from the hammer head 29.

Power unit 13 preferably has an inner cavity to house the movable fitting 49 and the hammer head 29 that reciprocates vertically with the application of air pressure and is connected to baseplate 18 by hammer sleeve 42. The fitting 49, the hammer head 29, as well as the slapper 23 are comprised of heat-treated tool steel, A2 or O1, in at least one embodiment. To further describe the fitting 49, in a preferred embodiment, it measures about 1.6 inches diameter at its base and 1.33 inches diameter at its top. It has a height of about 1.33 inches and is movably fit within the cavity of power unit 13 to house the upper portion of movable hammer head 29 which also is housed by the hole for hammer head 27 at its lower portion.

Referring more particularly to hammer head 29 which has a symmetrical design constructed around a central vertical access it can be further described as follows. The upper portion is preferably a hollow cylinder measuring about 1.16 inches in diameter by about 0.48 inches in height and is circumscribed with two channels or grooves to hold 0-rings 38. Inside the hollow cylinder is another hollow cylinder that measures about 0.39 inches in diameter and 0.24 inches in height. This structure engages internally into a like structure inside the center of sleeve 49 when in operation Hammer head 29 has a shaft that protrudes from the upper portion vertically down and measures about 1.73 inches in length. The shaft is divided into two portions. The upper portion measures about 0.43 inches in diameter and is about 1.13 inches in length and tapers to a lower portion of about 0.32 inches in diameter and about 0.6 inches in length. When engaged, with air pressure, the hammerhead 29 moves up and down 51 reciprocally, through the hole for hammer head 27 to move the slapper 23 in an up and down 51 vibratory manner to smooth and flatten sheet metal 41.

Figure 5:
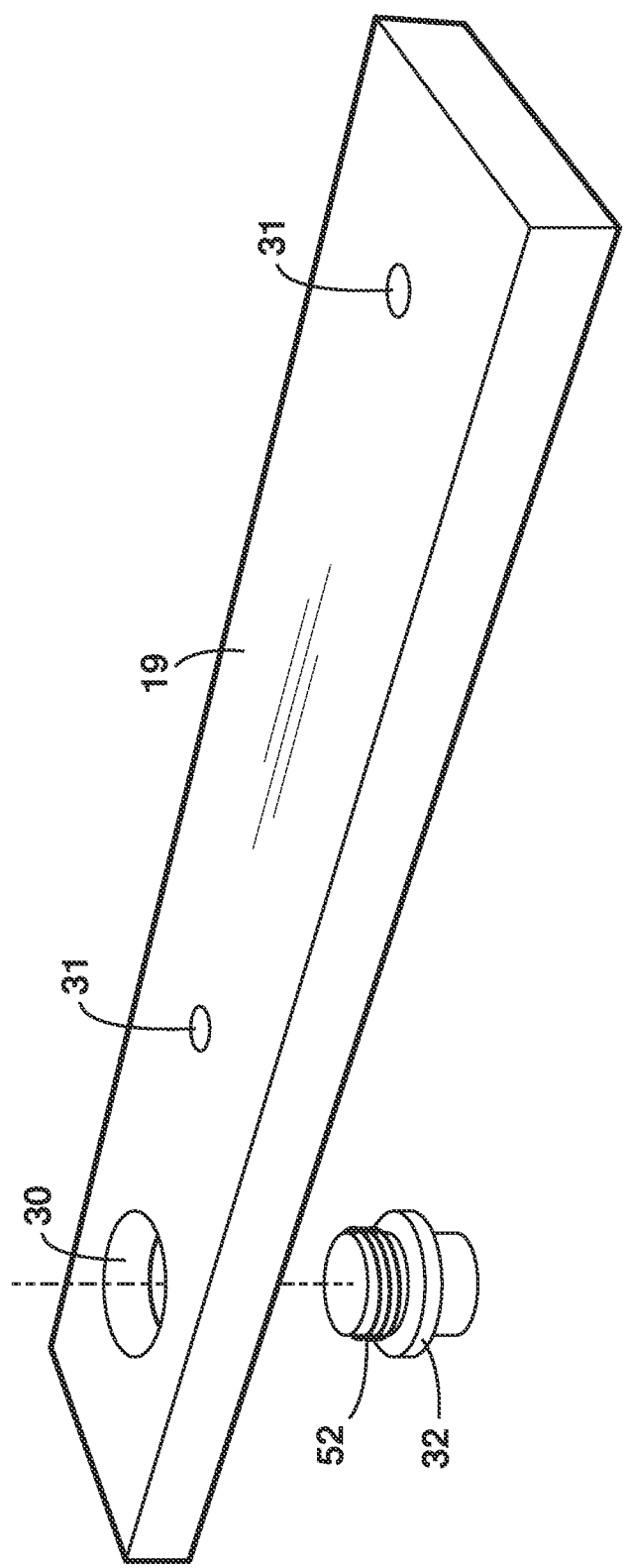
FIG. 5 is a perspective view of a second embodiment of the base plate.

Referring to FIG. 5 a perspective view of a second embodiment of the base plate 19. This base plate 19 measures about 8 inches long by about 1.5 inches wide by about 0.375 inches high. The base plate 19 contains at least two mounting screw holes 31 measuring about 0.125 inches in diameter. Mounting screw holes 31 on top of base plate 19 serve to connect handle 16 to baseplate 19. The hole for hammer head 30 fits an alternative hammer head 32. The power supply piston hits the underside of the hammer head 32 to create a hammering action for the unit Hammer head 32 and the base plate 19 may have flanges that keep a spring 52 and the hammer head 32 trapped in the base of the unit. In this embodiment, the slapper 23, 24, 25, 26 may be omitted and the hammering action occurs directly by the hammer head 32 on the surface of the sheet metal 41.

Figure 6:
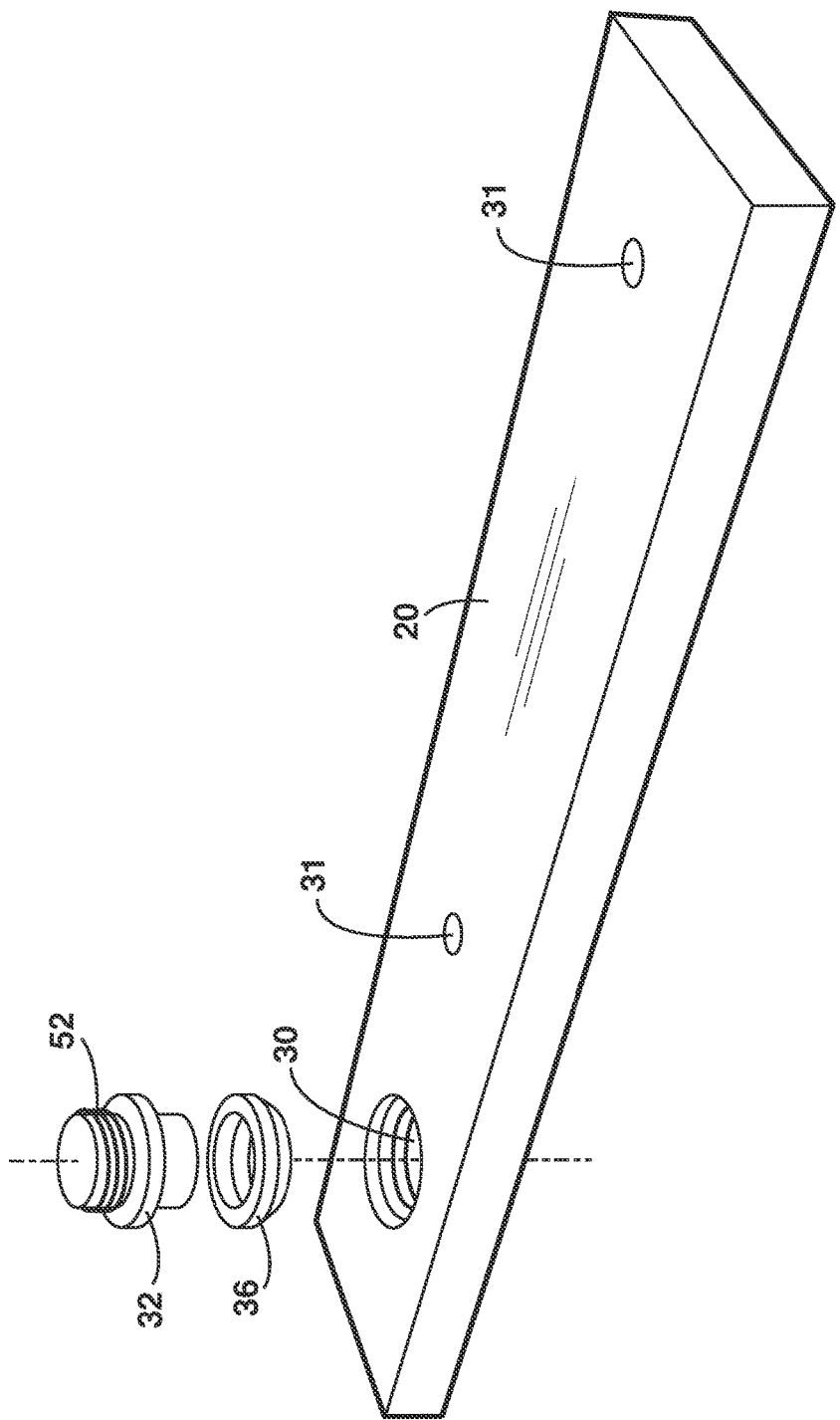
FIG. 6 is a perspective view of a third embodiment of the base plate

Referring to FIG. 6 a perspective view of a third embodiment of the base plate 20. This base plate 20 measures about 8 inches long by about 1.5 inches wide by about 0.375 inches high. The base plate 19 contains at least two mounting screw holes 31 measuring about 0.125 inches in diameter. Mounting screw holes 31 on top of base plate 20 serve to connect handle 16 to base plate 20. The hole for hammer head 30 fits the alternative hammer head 32. The power supply piston hits the underside of the hammer head 32 to create a hammering action for the unit Hammer head 32 and the base plate 20 have flanges that keep a spring 52 and the hammer head 32 trapped in the base of the unit. Alternative spring material 36 returns the hammer head 32 to create the hammering action. In this embodiment the slapper 23, 24, 25, 26 may be omitted and the hammering action occurs directly by the hammer head 32 on the surface of the sheet metal 41.

Figure 7:
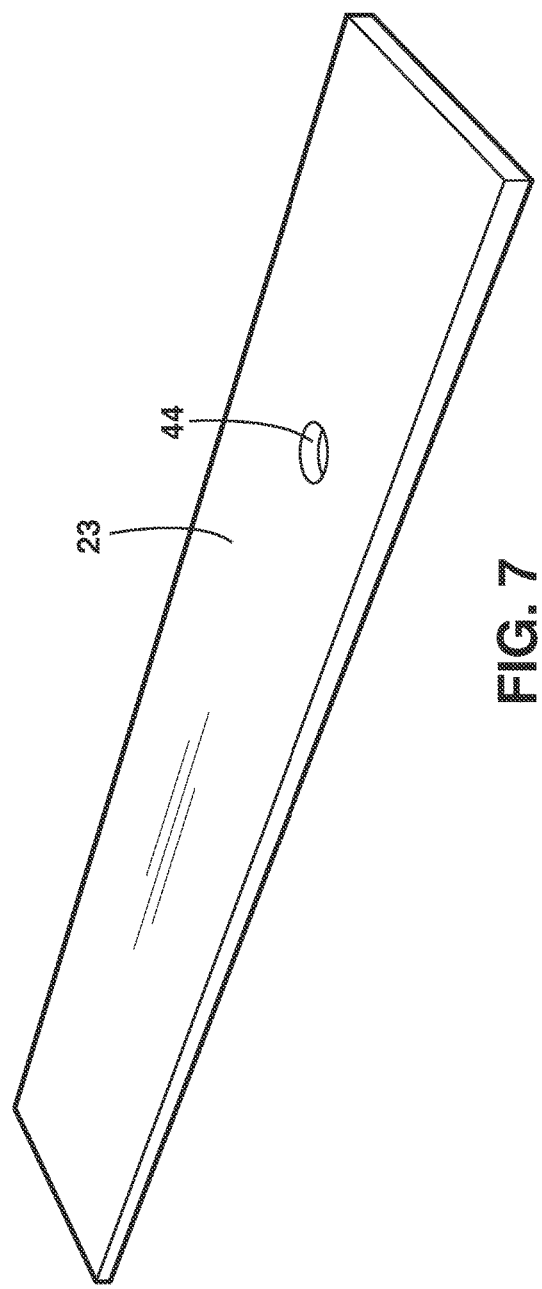
FIG. 7 is a perspective view of the planishing hammer slapper.

Referring to FIG. 7 a perspective view of the planishing hammer 12 slapper 23 is provided. The slapper 23 measures about 8 inches long by about 1.5 inches wide by about 0.19 inches high and contains at least one hole for adjusting screw hole 44 measuring about 0.375 inches in diameter. The face of the slapper 23 that contacts sheet metal is preferably flat or planer or may have a slight crown.

Figure 8:
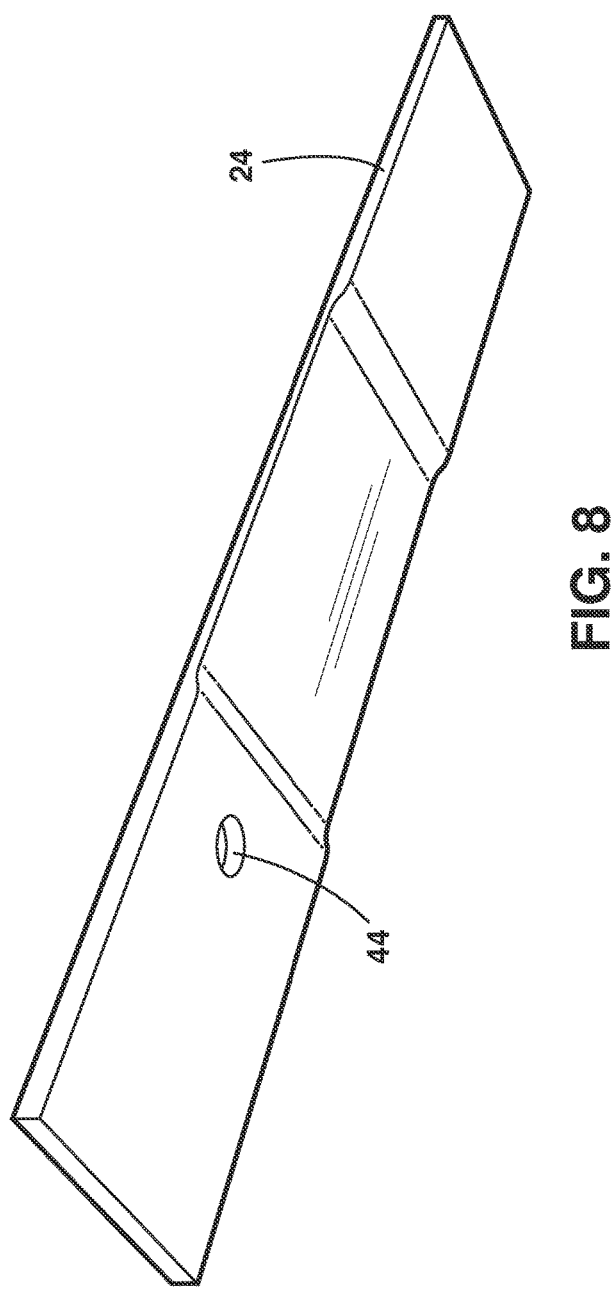
FIG. 8 is a perspective view of the second embodiment of the slapper.

Referring to FIG. 8 a perspective view of the second embodiment of the slapper 24. The slapper 24 measures about 8 inches long by about 1.5 inches wide by about 0.19 inches high and contains at least one hole for adjusting screw hole 44 measuring about 0.375 inches in diameter. In this embodiment about one third of the center of slapper 24 has a section of about 0.1 inches of its thickness removed so that the desired size of the impact area at the distal end is achieved.

Figure 9:
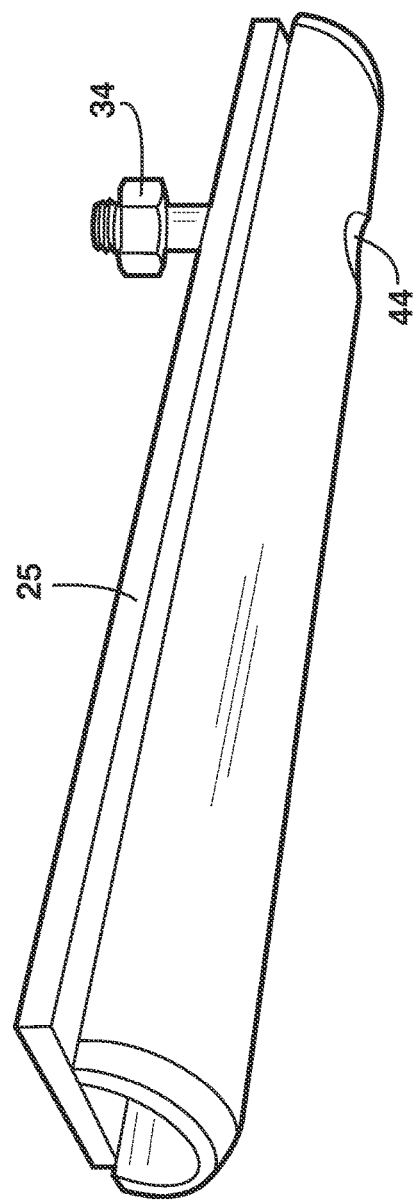
FIG. 9 is a perspective view of the third embodiment of the slapper

Referring to FIG. 9 a perspective view of the third embodiment of the slapper 25. The slapper 25 measures about 8 inches long by about 1.5 inches wide by about 0.85 inches high and contains at least one hole for adjusting screw hole 44 measuring about 0.43 inches in diameter accommodating adjusting bolt 34. In this embodiment, the slapper has a cylindrical extension, as shown.

Figure 10:
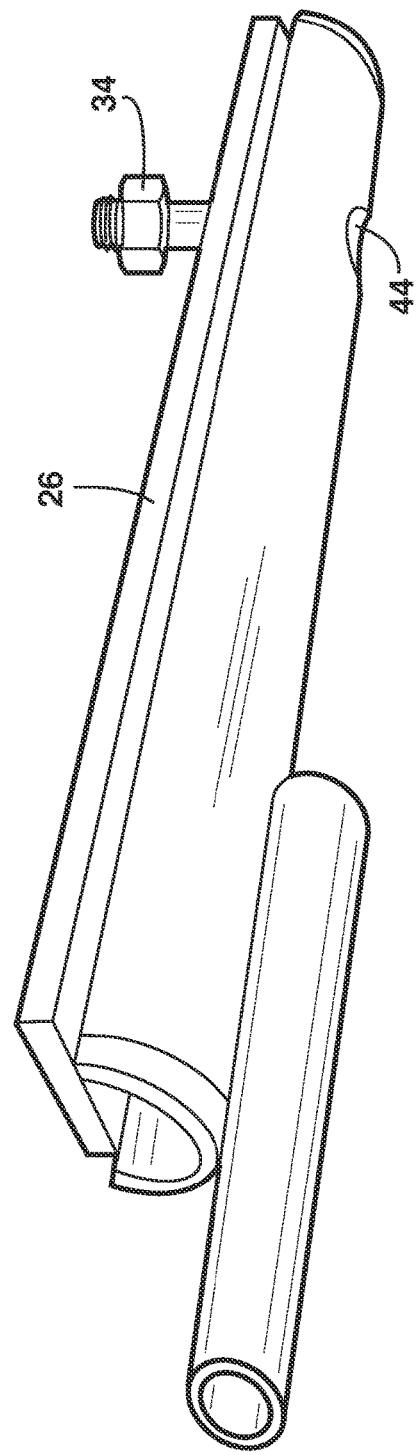
FIG. 10 is a perspective view of the fourth embodiment of the slapper.

Referring to FIG. 10 a perspective view of the fourth embodiment of the slapper 26. The slapper 26 measures about 8 inches long by about 1.5 inches wide by about 0.85 inches high and contains at least one hole for adjusting screw hole 44 measuring about 0.43 inches in diameter accommodating adjusting bolt 34. A tube 50 measures about 6 inches long by about 0.75 inches in diameter and is permanently affixed to the bottom of slapper 26 to protrude beyond one end of slapper 26 and is used for smoothing and flattening the inside of filleted holes in sheet metal 41 surfaces.

Referring to FIG. 11 a perspective view of the slapper 23 blanket cover 46. A blanket cover 46 is made from plastic such as ABS, leather or other composite material and measures about 8 inches long by about 1.5 inches wide by about 0.125 inches high and is secured by an adhesive 45 to the bottom of the slapper 23, 24, 25, 26.

Referring to FIG. 12 a perspective view of the formed cover 47. The formed cover 47 is made from plastic such as ABS, leather or other composite material and measures about 8 inches long by about 1.5 inches wide by about 0.32 inches high and is secured by an adhesive 45 to the bottom of the slapper 23, 24.

Figure 13:
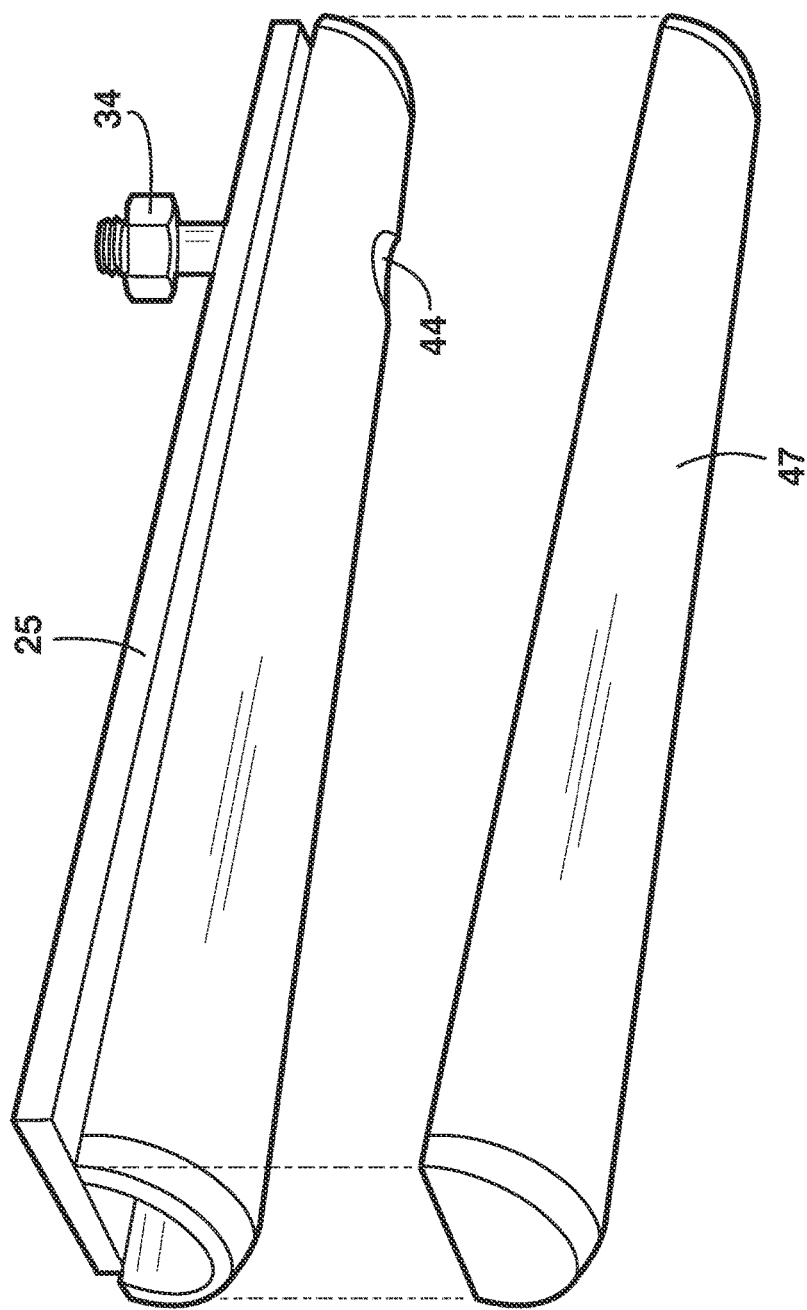
FIG. 13 is a perspective view of another embodiment of the formed cover.

Referring to FIG. 13 a perspective view of another embodiment of the formed cover 47. In this embodiment the formed cover 47 is made from plastic such as ABS, leather or other composite material and measures about 8 inches long by about 1.5 inches wide by about 0.6 inches high and is secured by an adhesive 45 to the bottom of the slapper, 25, 26.

It should be noted that any of the dimensions cited could vary by plus or minus 25 percent in other embodiments. The present invention is described in the previous examples, which are set forth to aid in the understanding of the invention and should not be construed to limit in any way the scope of the invention as defined in the claims which follow thereafter.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A power planishing hammer comprising:
a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source;
a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position;
a baseplate fixedly attached to the housing between the housing and the slapper;
at least one keeper attached circumferentially about at least a portion of the base plate, the at least one keeper configured to house the slapper therein; and
a control lever for controlling application of the power.

2. The power planishing hammer of claim 1, wherein the baseplate is fixedly attached to the housing at the proximal end of the housing.

3. The power planishing hammer of claim 2, wherein the baseplate is unrestrained at the distal end of the housing.

4. The power planishing hammer of claim 2, comprising a tubular hammer sleeve located between the housing and the base plate, the tubular hammer sleeve providing a sleeve housing for the hammer head.

5. The power planishing hammer of claim 1, comprising a spring material at the proximal end between the baseplate and the slapper, such when the hammer head impacts the slapper, the spring material deflects elastically.

6. The power planishing hammer of claim 5, wherein the spring material isolates the slapper from the baseplate.

7. The power planishing hammer of claim 1, wherein a distance between the pivot point of the slapper and the hammer head is between about 6 inches and about 12 inches.

8. The power planishing hammer of claim 1, wherein the slapper has a width of about 2 inches to about 4 inches.

9. The power planishing hammer of claim 1, wherein the control lever allows for variable control of the power.

10. The power planishing hammer of claim 1, wherein the slapper has a planer outward face.

11. The power plenishing hammer of claim 1, wherein the slapper has an outward face with a crown therein.

12. The power planishing hammer of claim 1, wherein the slapper has a semi-circular cylindrical face.

13. The power planishing hammer of claim 1, wherein the slapper has a tubular extension outward from the distal end of the housing.

14. The power planishing hammer of claim 1, wherein the slapper is removably attached to the housing and wherein the hammer head is interchangeable.

15. A power planishing hammer comprising:
a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source;
a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position; and
a spring material at the proximal end between the baseplate and the slapper, such when the hammer head impacts the slapper, the spring material deflects elastically.

16. The power planishing hammer of claim 15, wherein the spring material isolates the slapper from the baseplate.

17. A power planishing hammer comprising:
a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source; and
a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position, wherein a distance between the pivot point of the slapper and the hammer head is between about 6 inches and about 12 inches.

18. A power planishing hammer comprising:

a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source;

a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position;

a baseplate fixedly attached to the housing between the housing and the slapper;

at least one keeper attached circumferentially about at least a portion of the base plate, the at least one keeper configured to house the slapper therein; and a control lever for controlling application of the power wherein the slapper has an outward face with a crown therein.

19. A power planishing hammer comprising:

a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source; and a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position, wherein the slapper has a semi-circular cylindrical face.

20. A power planishing hammer comprising:

a power unit having a housing with a proximal end and a distal end opposite the proximal end and a handle in a horizontal direction between the proximal end and the distal end, the power unit housing comprising a hammer head movably coupled to the housing, the hammer head configured to move in a vertical direction reciprocally with an application of power from a power source; and a slapper pivotally coupled to the housing at the proximal end and configured to be impacted by the hammer head at the distal end, such that when impacted by the hammer head, moves in a direction outward from the housing from a first position to a second, extended position, and when the hammer head retracts inward toward the housing, retracts back to the first position from the second position, wherein the slapper has a tubular extension outward from the distal end of the housing.

* * * * *